March 21, 1967 D. L. FLOWERS 3,310,421

MAGNETIC RECORDING MEDIUM WITH POLYOLEFIN BASE AND A SUBCOATING THEREON

Filed Sept. 13, 1963

INVENTOR.
DERVIN L. FLOWERS

BY [signature]
ATTORNEY

United States Patent Office 3,310,421

Patented Mar. 21, 1967

3,310,421
MAGNETIC RECORDING MEDIUM WITH POLYOLEFIN BASE AND A SUBCOATING THEREON

Dervin L. Flowers, Redwood City, Calif., assignor to Ampex Corporation, Redwood City, Calif., a corporation of California Filed Sept. 13, 1963, Ser. No. 308,692
2 Claims. (Cl. 117—76)

Figure 1:
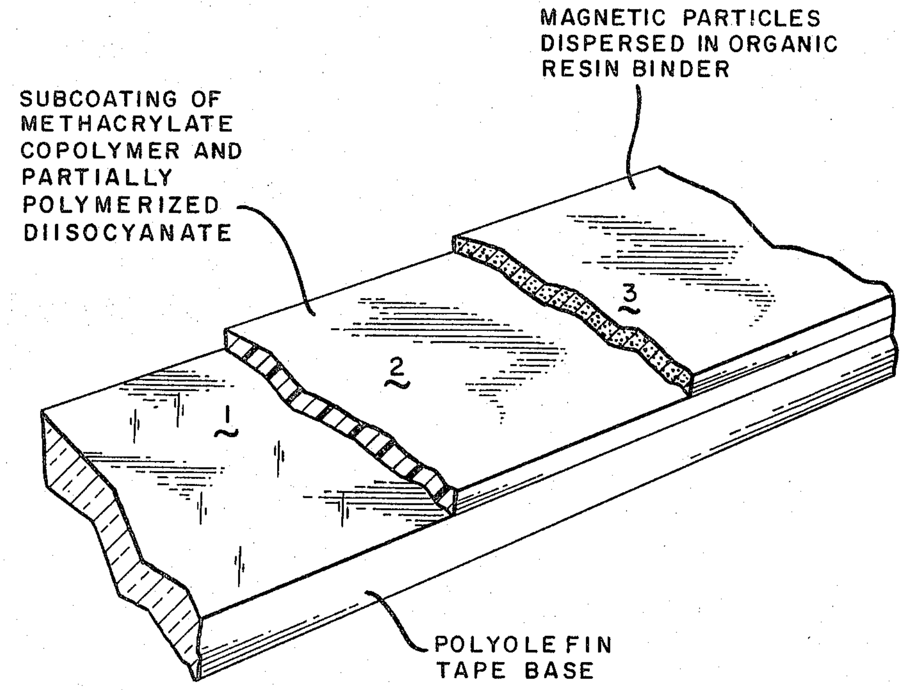

This invention relates to improvements in the materials used for making magnetic recording media and more particularly relates to a novel subcoating for use on tape bases, particularly polyolefin tape bases, prior to the application of conventional magnetic coating materials.

Polyolefin plastics, and particularly polypropylene, form highly desirable tape bases since these materials are inexpensive, fire resistant, strong, and, most important of all, have an extremely smooth surface so that tapes having good short wave length response and low drop-out characteristics can be manufactured. However, such tape bases do have one drawback, since conventional tape coatings such as those which are conventionally used with materials such as cellulose acetate and Mylar (polyethylene terephthalate) do not adhere to the polyolefin bases. Although this can be partially alleviated by means known in the printing art, such as heat treatment or electric corona discharge treatment, the results are not fully satisfactory and poor adherence is obtained when one attempts to use conventional coating formulations such as those based on finely divided magnetic particles dispersed in vinylidene chloride, vinyl acetate-vinyl chloride, butadiene-acrylonitrile, vinylidene chloride-acrylonitrile copolymers, and similar resin mixtures.

In accordance with the present invention, a novel subcoating composition is provided which has strong adherence to polyolefin tape bases and which forms a thin, hard film to which conventional coating formulations have a strong adherence. Although the coating formulation of the present invention has its primary utility as a subcoating, it can also be employed as a carrier for magnetic particles under conditions of light pigment loading. In the former, a polyolefin tape base is first coated with a thin coating of the novel polymer system hereinafter described, whereupon the thus-coated base becomes receptive to conventional tape coating formulations. When the novel coating formulations of the present invention are employed as a carrier for magnetic particles, the magnetic particles can be dispersed in the novel coating formulation of the present invention and applied directly to a polyolefin tape base with a conventional magnetic coating applied thereover to produce a double coated tape wherein the coatings may have different magnetic characteristics.

When using the coating formulation of the present invention as a subcoating, the subcoating may or may not be cured prior to the application of a conventional coating formulation. Under some circumstances, it is desirable to place the subcoating on the tape base and then cure it, and the second coating can be placed on the tape at some later time. It is also possible to apply the subcoating and immediately thereafter, by the employment of a tandem coater, apply a conventional formulation and then cure both coatings simultaneously. Alternatively, the tandem coater can be employed with some heating between the two coaters, so that the subcoating is partially cured prior to the application of the second coating.

The novel subcoating composition of the present invention comprises two components. The components are (1) a methacrylate copolymer, as is hereinafter defined, together with (2) a partially polymerized diisocyanate such as a toluene diisocyanate prepolymer.

The methacrylate copolymer is made by reacting a hydroxy methacrylate such as 2-hydroxy propyl methacrylate or hydroxy ethyl methacrylate with one or more acrylate or methacrylate esters. Preferably from about 5% to about 35% of the hydroxy methacrylate compound is used with the balance being one or more of the acrylate or methacrylate esters. Suitable acrylate or methacrylate esters include butyl methacrylate, isopropyl methacrylate, propyl methacrylate, or ethyl acrylate, or higher members of the family may be used such as decyl or stearyl acrylates or methacrylates. Normally the lower members of the series tend to give brittle products while the higher members of the series give soft or rubbery polymers. Therefore, normally a mixture is used of the higher and lower members of the ester series to yield a desirably hard product which is neither brittle nor rubbery.

In addition to the acrylates, the copolymer may contain a minor percent, up to about 10%, of a copolymerizable nitrogen containing monomer such as N-vinyl 2-pyrrolidone or 2-methyl 5-vinyl pyridine.

Ordinarily, any free-radical catalyst can be used to bring about the copolymerization. A minor amount of ditertiary butyl peroxide is suitable for this purpose. To prepare the copolymer, one merely mixes the various acrylates or methacrylates together with a suitable solvent such as toluene, xylene, tetrahydrofuran, methyl ethyl ketone, or mixtures thereof. Normally a relatively dilute solution is prepared containing at least half solvent. After the materials are mixed together, a small amount of a catalyst such as ditertiary butyl peroxide is added and polymerization initiated by raising the temperature to from about 100° C. to 150° C. Polymerization is normally complete in from about 5 to 24 hours.

Various diisocyanate prepolymers can be used, such as polymers of toluene diisocyanate. One particularly suitable prepolymer is sold under the trade name DV 1088 and has the following characteristics: It is prepared from a mixture of toluene diisocyanate and butane diol or similar diols. It is prepared with an excess of toluene diisocyanate so that reactive isocyanate groups are left on the prepolymer. The amount of the excess determines the molecular weight of the prepolymer. The molecular weight of the prepolymer used is between 500 and 5000 average. Another isocyanate, diphenyl methane isocyanate, of the formula

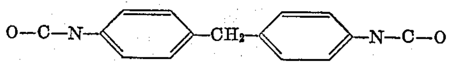

can also be used for the prepolymer. This monomer is used in the series of polymers sold under the trade name Estane. DV 1088 is supplied as a 50% solids solution in toluene and may be adaquately cured by atmospheric moisture or with an amine catalyst depending on the time and the temperature desired for curing. DV 1088 has an active NCO content of 4.5% based on the 50% solution or 8.24% based on pure prepolymer. The pure prepolymer has a viscosity of approximately 320,000 cps. at 21° C. and an acid value of 0.1.

After the copolymer is prepared, it is mixed with the diisocyanate prepolymer and dissolved in a solvent such as toluene or the other solvent listed above. Normally, the ratio of the methacrylate polymer to the diisocyanate prepolymer will be from about 1:3 to about 1:25. A very dilute solution is prepared wherein the resin concentration is from 1% to 10%. If a magnetic pigment is to be employed, it is ground into the resin composition by means well known to those skilled in the art, such as by the use of a ball mill. Normally not over 25% of a magnetic pigment is employed on a resin solids basis. The coating thickness will depend on the manner in which the material is to be used. If used only as a subcoating for a conventional magnetic tape formulation, a thickness of 0.005 to 0.1 mil is suitable, while if the material is pigmented, a thickness of 0.2 to 0.5 mil is suitable. Any of the usual coating techniques can be employed such as by the use of a roll coater, gravure coater, knife edge coater, or the like.

The sole figure of the drawing is a perspective cut-away view of a tape embodying the present invention.

In the drawing 1 is the polyolefin tape base, 2 is the subcoating of methacrylate copolymer and partially polymerized diisocyanate and 3 is a coating of magnetic particles dispersed in an organic resin binder.

The following non-limiting examples illustrate preferred embodiments of the invention.

*Example 1*

Polymer preparation:

| | G. |
|---|---|
| N-vinyl 2-pyrrolidone | 0.65 |
| 2-hydroxy propyl methacrylate | 3.90 |
| Decyl methacrylate | 6.05 |
| Butyl methacrylate | 54.4 |
| Toluene | 65.0 |

These are mixed, purged with nitrogen for 10 minutes, then 0.23 g. of ditertiary butyl peroxide is added to the mixture, the polymerization tube is sealed, and the contents are reacted for 16 hours at 120° C. The resulting copolymer is precipitated by methanol and dried under vacuum. Yield: 84%.

Two grams of this polymer and 5 grams of diisocyanate prepolymer are dissolved in a solution to 100 ml. of toluene. The subcoat solution is applied to a polypropylene tape base with a felt applicator and cured by passing it through an oven. An audio mix coating comprising ferric oxide dispersed in a vinyl chloride-vinyl acetate and butadiene-acrylonitrile copolymer was then applied and dried. Adhesion was excellent.

*Example 2*

Polymer preparation:

| | G. |
|---|---|
| 2-hydroxy propyl methacrylate | 9.75 |
| Ethyl acrylate | 6.50 |
| Butyl methacrylate | 48.75 |
| Toluene | 65.0 |

These are mixed, purged with nitrogen for 10 minutes, then 0.23 g. of ditertiary butyl peroxide is added to the mixture. The polymerization tube is sealed and the contents are reacted for 16 hours at 120° C. The resulting copolymer is precipitated by methanol and dried under vacuum at 90° C. Yield: 78%.

Two grams of this polymer and 10 grams of diisocyanate prepolymer are dissolved in a solution to 100 g. with toluene. The subcoat solution was applied to the base film by standard reverse roll coating techniques and cured.

A video magnetic formulation having a Saran (vinylidene chloride-acrylonitrile copolymer) as a binder was applied and dried. Adhesion was excellent.

*Example 3*

Polymer preparation:

| | G. |
|---|---|
| 2-hydroxy propyl methacrylate | 16.2 |
| Ethyl acrylate | 9.75 |
| Butyl methacrylate | 39.0 |

These are mixed, purged with nitrogen for 10 minutes, then 0.23 g. of ditertiary butyl peroxide is added to the mixture. The polymerization tube is sealed and the contents are reacted for 16 hours at 120° C. The resulting copolymer preparation is dried at 120° C. for 3 hours under vacuum at 1 mm. Hg. Yield: 82%.

Two grams of this polymer and 12 grams of diisocyanate prepolymer are dissolved in a solution to 100 g. with toluene. The subcoat solution was applied to the base film by standard gravure coating techniques and cured.

Audio mix as in Example 1 was applied and dried. Adhesion was excellent.

*Example 4*

Polymer preparation:

| | G. |
|---|---|
| 2-hydroxy propyl methacrylate | 3.25 |
| Ethyl acrylate | 6.5 |
| Butyl methacrylate | 42.3 |

These are mixed, purged with nitrogen for 10 minutes, then 0.23 g. ditertiary butyl peroxide is added to the mixture. The polymerization tube is sealed and the contents are reacted for 16 hours at 120° C. The resulting copolymer preparation is dried at 120° C. for 3 hours under vacuum at 1 mm. Hg. Yield: 80%.

Four grams of this polymer and 8 grams of diisocyanate prepolymer are dissolved in a solution to 100 g. total with toluene. The subcoat solution was applied to the base film by standard gravure coating techniques and cured.

A computer magnetic formulation (having a binder similar to Example 1) was next applied and dried. Adhesion was excellent.

*Example 5*

Polymer preparation:

| | G. |
|---|---|
| 2-hydroxy ethyl methacrylate | 13.0 |
| Ethyl acrylate | 6.5 |
| Butyl methacrylate | 45.5 |

These are mixed, purged with nitrogen for 10 minutes, then 0.23 g. of ditertiary butyl peroxide is added to the mixture. The polymerization tube is sealed and the contents are reacted for 16 hours at 120° C. The resulting copolymer preparation is dried at 120° C. for 3 hours under vacuum at 1 mm. Hg. Yield: 81%.

Two grams of this polymer and 6 grams of diisocyanate prepolymer are dissolved in solution to 100 g. total weight with toluene. This subcoating solution was applied to the base film by standard gravure coating techniques and suitably cured.

An audio magnetic formulation was applied and dried. Adhesion was excellent.

*Example 6*

Polymer preparation:

| | G. |
|---|---|
| 2-hydroxy ethyl methacrylate | 2.6 |
| Stearyl methacrylate | 13.0 |
| Butyl methacrylate | 49.4 |

These are mixed, purged with nitrogen for 10 minutes, then 0.23 g. of ditertiary butyl peroxide is added to the mixture. The polymerization tube is sealed and the contents are reacted for 16 hours at 120° C. The resulting copolymer preparation is dried at 120° C. for 3 hours under vacuum at 1 mm. Hg. Yield: 68%.

Two grams of this polymer and 3 grams of diisocyanate prepolymer are dissolved to a total solution weight of 100 g. in toluene. This subcoating solution is applied to the base film by standard gravure coating techniques and suitably cured.

An audio magnetic formulation was applied and dried. Adhesion was excellent.

*Example 7*

This example utilizes a partial filling of a methacrylate polymer such as characterized in Example 1 with gamma ferric oxide to promote adhesion as a subcoat for standard magnetic formulations. The subcoating is prepared and applied as follows: To a 100 g. solution in toluene which contains 2 grams of the polymer of Example 1 and 5 grams of diisocyanate prepolymer (for example the polyurethane DV 1088 supplied as a 50% solution by the Spencer-Kellogg Co.) are added 2 grams of gamma ferric oxide. The material is well mixed for 10 minutes in a "Quickie" mill on a Red Devil Paint Conditioner. The resulting mixture is applied by standard techniques to treated polypropylene and cured.

An audio magnetic formulation was applied and dried. Adhesion was excellent.

It will be noted that in Example 7 the subcoating itself contains a small amount of gamma ferric oxide. However, as has been noted above, the polymer formulation of the present invention finds its primary utility as a subcoating and normally a magnetic loading would only be applied to the subcoating under conditions where very light loading can be tolerated or when there is an outer coating of a more conventional magnetic pigment formulation placed on top of the coating of the present invention.

What is claimed is:

1. A magnetic recording medium comprising a polyolefin tape base having a first coating directly on the tape base and a second coating over the first coating wherein said first coating consists essentially of copolymer of a lower alkyl 2-hydroxy methacrylate and an ester selected from methacrylate esters and acrylate esters wherein the copolymer contains from 5 to 35 weight percent of the hydroxy compound, reacted with a diisocyanate prepolymer, the ratio of the copolymer and the prepolymer being from about 1:3 to about 1:25 and said second coating being a dispersion of finely divided magnetic particles dispersed in an organic resin binder.

2. A magnetic recording medium comprising a polyolefin tape base, a subcoating on said base and a coating over the subcoating comprising finely divided magnetic particles dispersed in an organic resin binder, said subcoating consisting of a reaction product of a methacrylate copolymer and a partially polymerized diisocyanate in a ratio of from 1:3 to about 1:25 parts by weight and wherein the methacrylate copolymer consists of from about 5 to about 35 percent by weight of a 2-hydroxy methacrylate copolymerized with from 95 to 65 percent by weight of an ester selected from the group consisting of methacrylate esters and acrylate esters and mixtures thereof and the diisocyanate consists of a partially polymerized member selected from the group consisting of toluene diisocyanate and diphenyl methane diisocyanate, the partly polymerized material having an average molecular weight of from 500 to 5000.

References Cited by the Examiner

UNITED STATES PATENTS

| | | | |
|---|---|---|---|
| 2,422,271 | 6/1947 | Vaala et al. | 260—850 |
| 2,757,099 | 7/1956 | Speed et al. | 117—7 |
| 3,023,126 | 2/1962 | Underwood et al. | 117—76 |
| 3,085,903 | 4/1963 | Bemmels et al. | 117—76 |
| 3,116,159 | 12/1963 | Fisher et al. | 117—71 |
| 3,144,352 | 8/1964 | Talley | 117—138.8 |
| 3,150,995 | 9/1964 | Bauer | 117—235 |
| 3,198,692 | 8/1965 | Bridgeford | 117—138.8 X |
| 3,200,007 | 8/1965 | Flowers | 117—235 |
| 3,228,881 | 1/1966 | Thomas | 252—62.5 |
| 3,242,005 | 3/1966 | Moritz et al. | 117—235 |
| 3,247,017 | 4/1966 | Eichler et al. | 117—235 |

WILLIAM D. MARTIN, *Primary Examiner.*

W. D. HERRICK, *Assistant Examiner.*